Oct. 31, 1939.　　　　H. R. GRAYBILL　　　　2,178,256
ANIMAL TRAP
Filed June 23, 1938

INVENTOR
Hershey Roy Graybill
BY
Louis Prevost Whitaker
ATTORNEY

Patented Oct. 31, 1939

2,178,256

UNITED STATES PATENT OFFICE 2,178,256

ANIMAL TRAP

Hershey Roy Graybill, Manheim, Pa., assignor to Animal Trap Company of America, Lititz, Pa., a corporation of Pennsylvania Application June 23, 1938, Serial No. 215,327

7 Claims. (Cl. 43—87)

My invention consists in the novel features hereinafter described, reference being had to the accompanying drawing which illustrates one embodiment of the invention selected by me for purposes of illustration, and the said invention is fully disclosed in the following description and claims.

Snare traps as heretofore used, have ordinarily required considerable room for the expansion of the noose tensioning device and if placed in a narrow runway or other confined space where the tensioning device might be arrested by an obstruction, the noose would not be drawn taut, and the animal could escape. On this account, snare traps are ordinarily used only in open country.

One of the advantages of my invention is the provision of a snare trap which takes up no more room in setting or springing than the conventional steel trap, and therefore it can be placed in the narrow runway of an animal without fear that its operation will be in any way arrested. At the same time, it gives a certain amount of freedom of movement to the animal while holding it firmly so that it cannot escape.

Referring to the accompanying drawing.

Figure 1:
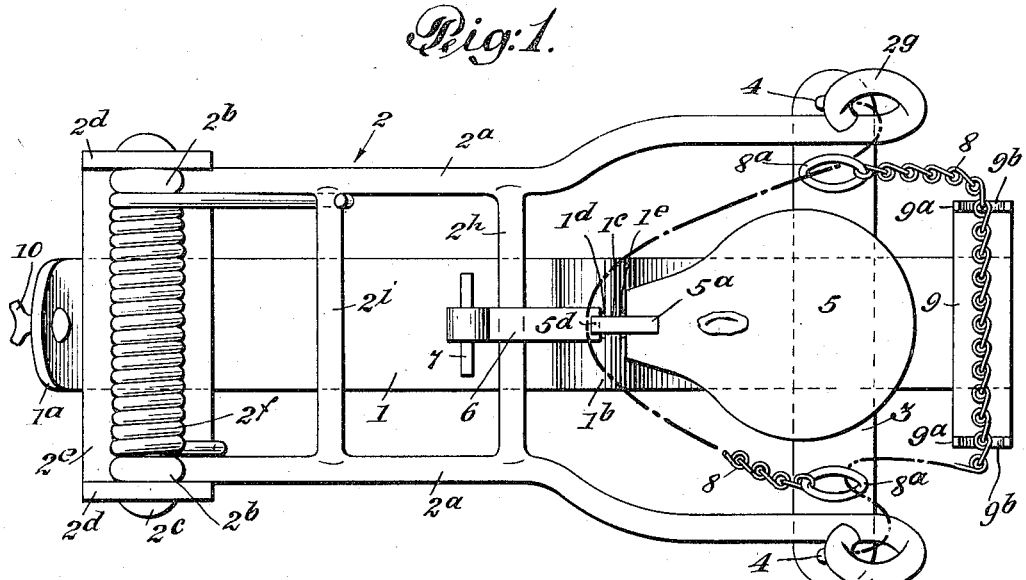
Fig. 1 is a top plan view illustrating my improved trap in set position.

In the embodiment of my invention shown in the accompanying drawing, and selected by me for purposes of illustration, 1, represents the base plate provided at one end with an upturned portion 1a, to which a chain or other fastening device is suitably connected as indicated at 10, so that the trap may be attached to a permanent stake or other securing means. The base plate 1, has an upwardly curved portion 1b, carrying a pivot 1c, which is preferably integral with the base plate and is formed by cutting slots 1d, 1e, on opposite sides of the pivot portion 1c.

2, represents a spring actuated swinging or pivotally mounted frame, comprising in this instance side bars 2a—2a, suitably connected by cross bars 2h and 2i, preferably formed integrally with the side bars, or rigidly connected therewith in any suitable manner. The rear ends of the side bars 2a, are each provided with an eye or pivot aperture 2b, to engage a pivot pin 2c, supported in upturned ends 2d, of a cross plate 2e, which is riveted, welded or otherwise secured to the base plate 1. A spring 2f, is slipped over the pivot pin 2c, when the parts are assembled, one end of the spring being connected to the plate 2e, and the other end being connected in this instance to the cross bar 2i, so that the force of the spring tends to raise the swinging frame in a direction away from the base plate 1. At their outer ends, the side bars 2a, 2a, are each provided with an aperture, preferably in the form of an eye or ring indicated at 2g.

Near the opposite end of the base plate 1, it is provided with a cross bar 3, having a length substantially equal to the width of the swinging frame between apertures or rings 2g, formed at the extremities of the side bars 2a. The cross bar 3, is provided adjacent to each end with a fastening device indicated at 4, to which one end of one of the snare members is attached.

5, represents the usual pan provided with a shank 5a, pivotally mounted on a pivot 1c, of the base plate 1, and provided with a locking detent 5d, to engage the usual dog 6. The dog 6, is shown as pivotally mounted on a bracket 7, secured to the base plate in position to overlie the cross bar 2h, of the swinging frame when the latter is swung downward into set position, and engaged by the detent 5d, on the pan shank in the usual manner as in the construction of steel traps.

Figure 3:
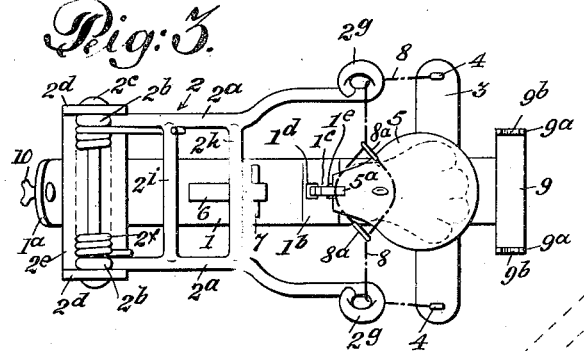
Fig. 3 is a top plan view drawn to a smaller scale showing the trap in its sprung condition, the leg and foot of an animal being indicated in dotted lines.

The snare proper consists of two flexible members which may be chains as shown, or may be wires, cords or other suitable flexible connections. I prefer to form the snare of two such flexible connections 8—8, each of which has one end permanently connected to one of the securing devices 4, of the cross bar 3, and is provided at its opposite ends with a ring 8a, through which the other snare member 8, is passed in the manner clearly shown in Figs. 1 and 3. To facilitate the laying of the snare around the pan, I prefer to provide the base plate 1, with snare retaining means for holding one portion of the snare forward and clear of the pan. In this instance, I have shown the base plate 1, provided with a bracket comprising a plate 9, having upturned ends 9a, which are deeply recessed at 9b, the side walls of the recess inclining outwardly away from each other as shown, so as not to interfere with the upward movement of the snare when the trap is sprung. Each of the snare members has a portion between the eye or loop 8a, of the other member, and the fastening device 4, which extends through one of the apertures or rings 2g, of the swinging frame in the manner shown in the drawing, so that the upward movement of the spring actuated frame 2, tends to stretch the snare members 8, between the apertures or rings 2g, at the outer ends of the arms of the swinging frame, and close the snare completely, bringing the rings or eyes 8a, together at the limit of its movement. Obviously, the leg of an animal caught within the snare will be completely embraced, and the snare will be drawn tightly around the animal's leg and held there in that position by the tension of the spring 2f, as clearly shown in Fig. 3.

In setting the trap, it is only necessary to swing down the frame 2, into a substantially horizontal position, drop the dog 6, over the cross bar 2h, of the frame, and secure it by interlocking it with the detent 5d, of the pan 5, in the usual manner. This leaves the snare practically entirely loose as the apertures or rings 2g, of the frame, when the latter is in a horizontal position, are closely adjacent to the fastening devices 4, for the engagement of the ends of the snare members. The snare can then be spread in the manner indicated in Figs. 1 and 2, by placing portions of one of the snare members in the recesses 9b, of the retaining members 9a, and disposing the other snare member 8, so that it rests upon the dog 6, the shoulder 5d, assisting in holding that portion of the snare in place, and preventing its slipping forward over the pan.

The trap is sprung by the foot of the animal depressing the pan 5, in the usual manner of steel traps, thus releasing the dog 6, and the spring actuated frame which instantly rises, carrying with it the snare members. This carries the snare well up along the animal's leg, at the same time closing it to embrace the leg very firmly in the manner indicated in Fig. 3. As the trap is sprung, the dog 6, will fly upwardly and assist in raising that portion of the snare member which rests upon it in the set position of the trap. While the snare will hold the animal's leg very securely, it permits a certain amount of rocking movement of the leg longitudinally of the trap and also laterally thereof, without injuring the animal's limb.

Figure 2:
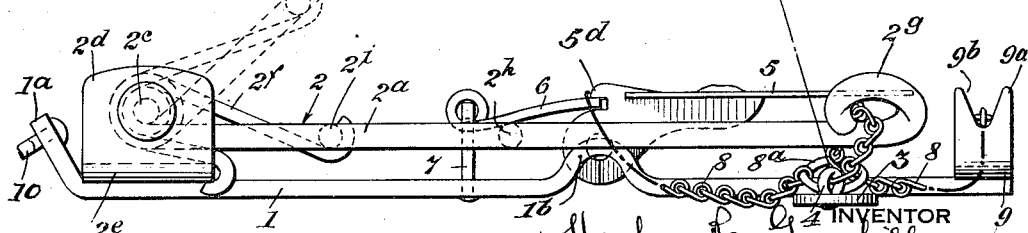
Fig. 2 is a side elevation of the trap, as shown in Fig. 1, dotted lines indicating the position of the swinging frame after the trap is sprung.

To free the animal from the trap, it is only necessary to slightly depress the swinging frame 2, from the raised position, indicated in dotted lines in Fig. 2, thereby loosening the snare and freeing the animal's leg.

It will be seen that the form of my improved trap is such that it can be readily placed in the runway of an animal, or other constricted situations, as the only room for expansion that is needed, is directly above the trap, and therefore the trap cannot be defeated by encountering obstructions. It also provides the desirable elevation of the snare so that it catches the animal's leg well above the foot, and also gives a certain amount of freedom of movement to the animal's leg without pain or serious inconvenience, which is not possible with a steel trap.

In many traps of the snare type, it is possible that an animal caught in one of these traps may drag the trap until it comes into contact with an obstruction, and thereafter, by its attempts to escape, may press the trap spring and loosen the portion of the snare surrounding its leg. An additional advantage of this trap is that since the arms 2a, of the frame 2, are rigid, and the portions of the snare between them including the parts surrounding the animal's leg are stretched tightly between the apertures or rings at the outer ends of said arms, should an animal pull the trap against an obstruction and thereafter strain on the snare in its efforts to escape, both arms will be equally depressed, so that neither portion of the snare becomes slack and the slack will immediately be taken up in both snare members if the animal ceases its pull on the snare. This makes it possible to use the trap in places where other forms of snare traps would be impractical.

What I claim and desire to secure by Letters Patent is:

1. A snare trap comprising a base, a spring actuated pivotal snare tightening member provided with spaced apertured portions, flexible snare members secured to said base, and having portions extending and freely movable through said spaced apertured portions, and forming a snare between them, and setting and tripping means for said snare tightening member.

2. A snare trap comprising a base, a spring actuated frame pivotally connected with said base and provided with laterally spaced eyes, flexible snare members, each secured at one end to said base passing freely through one of said eyes, and provided with a ring at its opposite end through which the other snare member freely passes and forming a snare between said eyes, and setting and tripping mechanism for said frame.

3. A snare trap comprising a base, a spring actuated frame pivoted thereto, and provided with laterally spaced portions provided with guiding apertures, flexible snare members, each having one end secured to the base, passing freely through one of said guiding apertures and provided at its other end with a ring loosely engaging the other snare member between said apertures, a dog and trip pan pivotally mounted on said base for locking the said frame adjacent the inner side of the pan.

4. A snare trap comprising a base, a spring actuated frame pivotally connected with said base and provided at its free end with a pair of laterally separated rigid arms having guiding apertures, a dog and tripping pan pivotally connected with said base, for locking said frame in set position, flexible snare members each connected to the base at one end, extending loosely through one of said guiding apertures and provided with a ring to loosely engage the other snare member between its corresponding ring and the guiding aperture.

5. A snare trap comprising a base, a spring actuated frame pivotally connected with said base and provided at its free end with a pair of laterally, separated rigid arms having guiding eyes at their outer ends, a dog and tripping pan pivotally connected with said base for locking said frame in set position, flexible snare members, each connected to the base at one end, extending loosely through the guiding eye of one of said rigid arms, and provided with a ring to loosely engage the other snare member between its corresponding ring and the other of said arms, and a pair of upwardly extending snare retaining devices connected with said base on the outer side of the pan, and provided each with a recess to engage and position one of said snare members when the trap is set.

6. A snare trap comprising a base, a spring actuated frame pivotally connected with said base and provided at its free end with a pair of laterally separated rigid arms having guiding eyes at their outer ends, a dog and tripping pan pivotally connected with said base for locking said frame in set position, flexible snare members, each connected to the base at one end, extending loosely through the guiding eye of one of said rigid arms, and provided with a ring to loosely engage the other snare member between its corresponding ring and the other of said arms, and a pair of upwardly extending snare retaining devices connected with said base on the outer side of the pan, and provided each with a recess to engage and position one of said snare members when the trap is set, said recesses having upwardly diverging sides to facilitate the withdrawal of the snare member when the trap is sprung.

7. A snare trap comprising a base, a pair of connected rigid arms pivoted to said base, and having their outer ends provided with guiding eyes, a dog pivotally connected to said base for locking said arms in set position, a tripping pan for said dog pivotally connected with the base and having a dog engaging detent extending above the plane of the upper face of the dog in the set position of the trap, flexible snare members each connected to the base at one end, extending loosely through the guiding eye of one of said rigid arms and provided with a ring at its other end to loosely engage the other snare member between its corresponding ring and the other of said arms, and a pair of snare retaining devices on the outer side of the pan provided with recesses to engage in position one of said snare members when the trap is set, the other snare member being positioned upon said dog in the set position of the trap, and retained from movement toward the pan by said detent.

HERSHEY ROY GRAYBILL.